United States Patent [19]

Mortiz

[11] Patent Number: 5,038,567
[45] Date of Patent: Aug. 13, 1991

[54] METHOD OF AND MEANS FOR USING A TWO-PHASE FLUID FOR GENERATING POWER IN A RANKINE CYCLE POWER PLANT

[75] Inventor: Alex Mortiz, Holon, Israel

[73] Assignee: Ormat Turbines, Ltd., Yavne, Israel

[21] Appl. No.: 622,341

[22] Filed: Nov. 29, 1990

Related U.S. Application Data

[63] Continuation of Ser. No. 365,006, Jun. 12, 1989, abandoned.

[51] Int. Cl.$^5$ ............................................. F03G 4/06
[52] U.S. Cl. .................................. 60/641.5; 60/671; 60/676
[58] Field of Search ................. 60/641.2, 641.3, 641.4, 60/641.5, 676, 651, 671

[56] References Cited

U.S. PATENT DOCUMENTS

| | | | |
|---|---|---|---|
| 3,950,949 | 4/1976 | Martin et al. | 60/676 X |
| 4,057,964 | 11/1977 | Hutchinson | 60/641.5 |
| 4,132,075 | 1/1979 | Fleck et al. | 60/641.5 |
| 4,319,895 | 3/1982 | Kemmer | 60/641.5 |
| 4,542,625 | 9/1985 | Bronicki . | |
| 4,578,953 | 4/1986 | Krieger et al. . | |

Primary Examiner—Allen M. Ostrager
Attorney, Agent, or Firm—Sandler, Greenblum & Bernstein

[57] ABSTRACT

A method for using a two-phase fluid includes separating the fluid into its two phases, oen of which is a hot gas containing energy in the form of latent heat, and one of which is a hot liquid containing energy in the form of sensible heat; converting sensible heat in the liquid to sensible heat in a working fluid for producing preheated working fluid; and transferring latent heat in the gas to the preheated working fluid for vaporizing the same at substantially constant temperature and pressure.

23 Claims, 1 Drawing Sheet

METHOD OF AND MEANS FOR USING A TWO-PHASE FLUID FOR GENERATING POWER IN A RANKINE CYCLE POWER PLANT

This application is a continuation of application Ser. No. 365,006, filed June 12, 1989, now abandoned.

TECHNICAL FIELD

This invention relates to a method of and means for using a two-phase fluid for generating power in a Rankine cycle power plant, and more particularly, for using a two-phase fluid such as geothermal fluid extracted from a water dominated geothermal source.

BACKGROUND ART

Some two-phase fluids, such as fluids obtained from water dominated geothermal sources such as occur naturally in many areas of the world, contain a considerable amount of heat that can be utilized for power production using a Rankine cycle power plant. Because of the corrosive properties of such geothermal fluid, and engineering difficulties in designing heat engines to operate efficiently with a two-phase working fluid, it is conventional to separate the water and steam at the wellhead, and to utilize the two fluids in separate power plants. The steam may be used, either directly in a conventional steam turbine, or indirectly as the heat source for an organic working fluid Rankine cycle power plant such as shown in U.S. Pat. No. 4,542,625, the disclosure which is hereby incorporated by reference. Such an organic, Rankine cycle power plant comprises a vaporizer containing an organic fluid, such as a Freon, hydrocarbon, etc., which is vaporized by the application of the geothermal steam to the vaporizer. The resultant heat-depleted steam (condensate) at the outlet of the vaporizer is then disposed of, possibly by injection into what is termed a rejection well. Vaporized working fluid produced by the vaporizer is applied to a specially designed turbine which converts some of the heat in the working fluid to useful work and produces heat-depleted working fluid that is supplied to either a water, or an air cooled condenser wherein the heat-depleted working fluid is condensed into a liquid condensate that is returned to the vaporizer.

To increase the utilization of the heat contained in geothermal fluid, it is also conventional to use the liquid separated from the steam for generating power. To this end, it is conventional to apply the hot geothermal water to another organic Rankine cycle power plant such as shown in U.S. Pat. No. 4,578,953, the disclosure of which is hereby incorporated by reference. The '953 patent discloses a cascade arrangement of vaporizers, each associated with its own turbine, and arranged so that the hot geothermal water passes serially from vaporizer to vaporizer. Improved thermodynamic efficiency is achieved by employing a preheater for each vaporizer and applying the heat-depleted geothermal water from the last stage of the cascade to all the preheaters in parallel, thereby preheating the working fluid in each stage before the working fluid enters the vaporizer of the stage.

In some situations, it is impractical to provide separate power plants, one utilizing geothermal steam, and the other utilizing geothermal water. Furthermore, the thermodynamic efficiency of a power plant operating on geothermal water may be too low to warrant the capital cost of the equipment.

It is therefore an object of the present invention to provide a new and improved method of and means for increasing the thermodynamic efficiency of a power plant operating with a two-phase fluid such as fluid obtained from a water dominated geothermal source.

DISCLOSURE OF THE INVENTION

The present invention provides a method for using a two-phase fluid comprising the steps of separating the fluid into its two phases, one of which is a hot gas containing energy in the form of latent heat, and one of which is a hot liquid containing energy in the form of sensible heat; converting sensible heat in the liquid to sensible heat in a working fluid for producing preheated working fluid; and transferring latent heat in the gas to the preheated working fluid for vaporizing the same at substantially constant temperature and pressure.

The two-phase fluid may be a water dominated geothermal fluid, one phase of which is hot water, and the other phase of which is steam. Preferably, the working fluid may be an organic fluid. In such case, the invention provides for expanding the vaporized working fluid in a heat engine to obtain work and heat-depleted working fluid, condensing the heat-depleted working fluid to produce condensed working fluid. In a broad aspect, the invention uses a two-phase fluid in a Rankine cycle power plant of the type having a vaporizer for vaporizing a working fluid, a heat engine responsive to vaporized working fluid for producing work and heat-depleted working fluid, and a condenser for condensing the heat-depleted working fluid and producing condensate that is returned to the vaporizer. The method according to the present invention includes the steps of separating the two-phase fluid into its two phases, one of which is a hot gas, and one of which is a hot liquid, passing said gas through the vaporizer wherein heat from the gas vaporizes working fluid in the vaporizer, and passing said liquid through a preheater interposed between the condenser and the vaporizer, heat from the liquid serving to preheat the condensate before it is returned to the vaporizer.

The present invention is operable with geothermal fluid extracted from a water dominated geothermal source, both the geothermal water and the geothermal steam being utilized in a single power plant rather than in separate plants. Thus, in the invention, the geothermal water preheats the working fluid before it is supplied to the vaporizer of the power plant and raises the temperature of the working fluid from the condenser temperature to a temperature just below the temperature of the vaporizer, and the geothermal steam heats the working fluid in the vaporizer under conditions of constant temperature and pressure. The available heat in the geothermal fluid, when utilized under these conditions, is more advantageously used than is the case were the geothermal steam applied to a power plant separate from the power plant to which the geothermal water is applied.

BRIEF DESCRIPTION OF DRAWINGS

Embodiments of the invention are shown in the accompanying drawings wherein.

DETAILED DESCRIPTION

Figure 1:
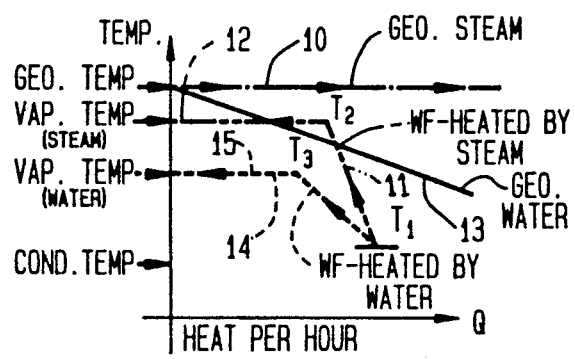
FIG. 1 is a plot of temperature versus heat input for a conventional arrangement in which geothermal steam and geothermal water are separately used in different power plants, in order to better understand the deficiencies of utilizing separate power plants for each phase of a two-phase, water dominated geothermal source.

Before discussing the details of the present invention, reference is made to FIG. 1 in order to further explain the problems associated with using separate Rankine cycle power plants for the geothermal water and for the geothermal steam produced by a two-phase, water dominated geothermal fluid source. Curve 10 represents, in an idealized manner, the variation in temperature of the geothermal steam component of the two-phase source as heat is transferred from the steam to a working fluid, e.g., an organic fluid, in a vaporizer containing working fluid at the temperature of the condenser. Except for the presence of non-condensable gases trapped in the steam, which adversely affects heat transfer, all of the heat transferred to the working fluid is derived from the latent heat in the steam whose temperature remains essentially constant.

Curve 11 represents the variation in the temperature of the working fluid as the latter is heated from its temperature entering the vaporizer (essentially the condenser temperature) designated by $T_1$ to the boiling point temperature $T_2$ of the working fluid. The area under curve 11 between the limits $T_1$ and $T_2$ corresponds to the so-called pre-heat required to increase the sensible heat of the working fluid to its boiling point. The pre-heat is actually a considerable percentage of the total heat supplied to the working fluid; and all of this heat is supplied by latent heat in the steam.

After the boiling point of the working fluid is reached, the latent heat of vaporization of the working fluid is supplied by the latent heat condensation of the steam as vaporization of the working fluid commences. The temperature of the working fluid remains constant during this phase as indicated by curve 12. During this phase, a greater amount of heat in the steam is transferred to the working fluid than during the pre-heat phase. Curves 10, 11, and 12 are thus representative of a Rankine cycle power plant operating on the steam component of a geothermal source as described in the '625 patent.

Curve 13 represents, in an idealized manner, the variation in temperature of the geothermal water component of the two-phase source as heat is transferred from the hot water to a working fluid, e.g., an organic fluid, in a vaporizer containing working fluid at the temperature of the condenser in a Rankine cycle power plant. All of the heat transferred from the water to the working fluid is sensible heat; and as a consequence, the water temperature drops as the temperature of the working fluid increases. In this case, the working fluid is preheated from temperature $T_1$ to $T_3$ (as shown by curve 14) by the water as the latter is cooled in the process. After the temperature of the working fluid reaches the boiling point, the temperature remains constant as indicated by curve 15. During this phase, the latent heat of vaporization of the working fluid is supplied by sensible heat in the water. Consequently, the maximum temperature available when the heat source is water will be less than that available when the source is steam. Curves 13, 14, and 15 are thus representative of a Rankine cycle power plant operating on the liquid water component of a geothermal source as disclosed in the '953 patent.

Considering that, in a steam-based power plant, the pre-heat portion of the operation is carried out very inefficiently from an energy standpoint, and that, in a water-based power plant, the boiling portion of the operation is carried out inefficiently, the result is that the overall operation of both power plants is not as efficient as possible. The present invention contemplates using both the steam and water components of the geothermal fluid in a single system. That is to say, the steam component is used under conditions that maximize the amount of heat extracted from the steam under optimum conditions of thermodynamic efficiency (i.e., the latent heat of vaporization of the working fluid during its boiling phase is supplied by latent heat in the steam component), and the water component is used under conditions that maximize the amount of heat extracted from the water under optimum efficiency conditions (i.e., sensible heat in the working fluid during its pre-heat phase is supplied by sensible heat in the water component).

Figure 3:
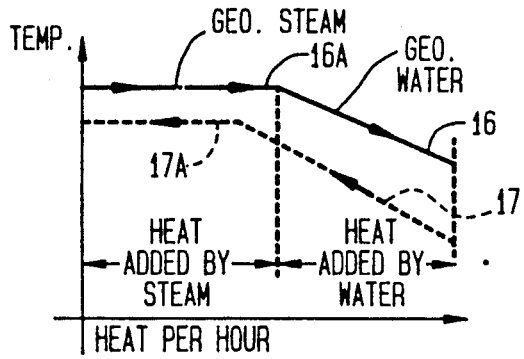
FIG. 3 is a plot of temperature versus heat input for the vaporizer/preheater arrangement shown in FIG. 2.

FIG. 3 illustrates apparatus that operates according to the present invention. Geothermal water is applied to the working fluid to preheat it resulting in a temperature variation as shown in curve 16. The resultant temperature variation in the working fluid is shown by curve 17. Note that the temperature of the water at the beginning of its heat transfer operation in the pre-heater of the power plant is the same as the temperature of the steam during its operation in the vaporizer. During the vaporization of the working fluid, the temperature of the steam remains substantially constant (except for the effect of the presence of non-condensable gases in the steam) as shown at 16A, and the temperature of the working fluid remains substantially constant as shown at 17A. Very little, if any, heat from the steam is used to preheat the working fluid.

Figure 2:
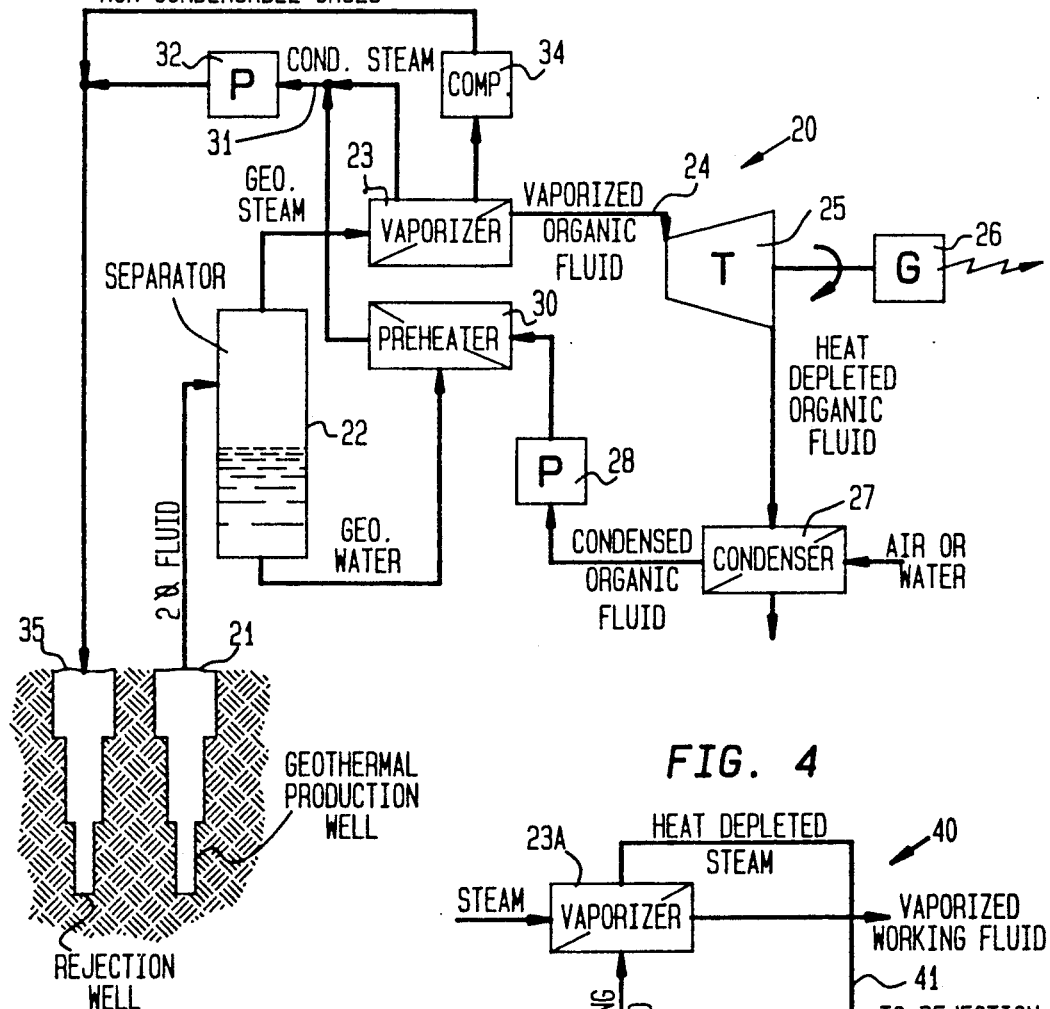
FIG. 2 is a block diagram of a power plant according to the present invention.

A power plant according to the present invention based on the above-described concept is designated by reference numeral 20 in FIG. 2 to which reference is now made. Power plant 20 is used in conjunction with geothermal production well 21 that produces a two-phase fluid such as water dominated geothermal fluid. The mixture of water and steam is applied to separator 22 where the steam is separated from the water, the steam being applied to vaporizer 23 containing a working fluid in the from of an organic fluid such as a Freon, hydrocarbon or the like, and the water being applied to preheater 30.

Preheater 30, by reason of its operation described below, supplies working fluid to the vaporizer at close to the boiling point. In the vaporizer, the working fluid is vaporized, the latent heat of vaporization being furnished by the latent heat of condensation in the steam. Conduit 24 supplies vaporized working fluid to turbine 25 which is effective to convert some of the heat contained in the working fluid into useful work by the operation of generator 26 coupled to the turbine, and to produced heat-depleted working fluid that is applied to condenser 27. Heat contained in the heat-depleted working fluid is rejected into the air, when an air cooled condenser is involved, or into cooling water, when a water cooled condenser is involved; and vapor in the condenser is condensed into liquid working fluid condensate.

Pump 28 receives the condensate, at essentially the temperature and pressure of the condenser, and pressurizes it for return to the vaporizer via pre-heater 30. In the preheater, geothermal water extracted by separator 22 from the geothermal fluid is brought into heat exchange relationship with the working fluid. Sensible heat in the water is transferred to the working fluid as sensible heat thus preheating the working fluid as indicated by curves 16 and 17 of FIG. 3. Thus, each component of the two-phase fluid operates in its most efficient mode; and the thermal efficiency of the power plant is greatly improved over the situation in which separate steam and water power plants are used.

The geothermal water that exits from preheater 30, after giving up its sensible heat to the working fluid thus preheating it, is combined at 31 downstream of the vaporizer with condensate that exits vaporizer 23. Pump 32 pressurizes the liquid for reinjection into rejection well 34. Non-condensable gases in the vaporizer are vented therefrom, compressed at 34, and also delivered to the rejection line for injection into rejection well 34. A procedure like that shown in the '625 patent can be utilized.

Figure 4:
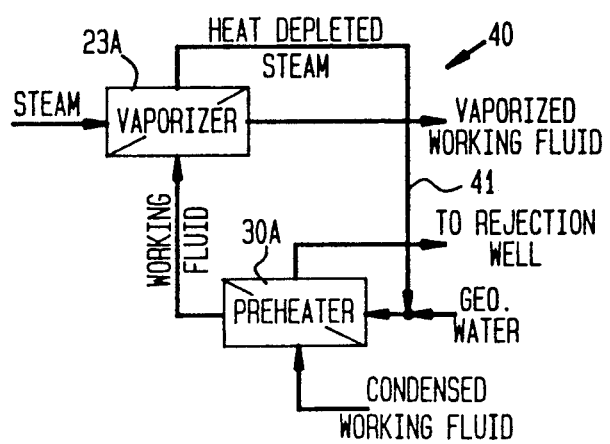
FIG. 4 is a modification of the vaporizer/preheater configuration shown in FIG. 2.

In a modification of the apparatus shown in FIG. 3, residual heat in the condensate exiting from the vaporizer is captured. Reference numeral 40 designates a modification of the construction of the vaporizer/preheater configuration shown in FIG. 3. Modification 40 comprises vaporizer 23A that receives steam from separator 22 and produces vaporized working fluid. I this modification, however, the heat depleted stream (condensate) exiting vaporizer 23A is mixed with the geothermal water exiting separator 22, and both are applied to preheater 30A. Consequently, working fluid in preheater 30A absorbs additional heat from the condensate exiting vaporizer 23A before the condensate is conveyed to the rejection well. FIG. 4 thus shows apparatus according to the present invention that includes means 41 for applying the heat depleted steam, or condensate, exhausted from the vaporizer to the preheater.

While the above description deals with a specific type of two-phase fluid, namely fluids derived from a water dominated geothermal source, the invention is also applicable to other types of two-phase fluids in which one phase is a hot gas, and the other phase is a hot liquid. Furthermore, the above-described invention is also applicable to situations where separate sources of hot steam and hot liquid or water are available.

The advantages and improved results furnished by the method and apparatus of the present invention are apparent from the foregoing description of the preferred embodiment of the invention. Various changes and modifications may be made without departing form the scope of the invention as described in the appended claims.

I claim:

1. A method for using a two-phase fluid comprising the steps of:
   a) separating the fluid into its two phases, one of which is a hot gas containing energy in the form of latent heat, and one of which is a hot liquid containing energy in the form of sensible heat;
   b) transferring sensible heat in the hot liquid to sensible heat in a liquid working fluid for producing only preheated liquid working fluid; and
   c) transferring latent heat in the hot gas to the preheated liquid working fluid for vaporizing the working fluid at substantially constant temperature and pressure.

2. A method according to claim 1 wherein the two-phase fluid is water dominated geothermal fluid, one phase of which is hot water, and the other phase of which is steam.

3. A method according to claim 1 wherein the working fluid is an organic fluid.

4. A method according to claim 3 including the steps of expanding the vaporized working fluid in a heat engine to obtain work and heat-depleted working fluid, condensing the heat-depleted working fluid to produce condensed working fluid, and using the condensed working fluid to provide said working fluid.

5. A method according to claim 2, wherein the step of transferring heat in the steam to the working fluid produces heat-depleted steam, and wherein the method further includes transferring heat in the heat-depleted steam to the working fluid for preheating the same.

6. A method according to claim 2 further comprising the step of passing steam condensate, produced when the geothermal steam passes through said vaporizer, through said preheater.

7. A method for using a two-phase fluid in a Rankine cycle power plant of the type having a vaporizer for vaporizing a working fluid, a heat engine responsive to vaporized working fluid for producing work and heat-depleted working fluid, and a condenser for condensing the heat-depleted working fluid and producing condensate that is returned to the vaporizer as a liquid, said method comprising the steps of:
   a) separating the two-phase fluid into its two phases, one of which is a hot gas that contains latent heat that is released when the gas condenses into a condensate, and one of which is a hot liquid that contains sensible heat;
   b) passing said gas through the vaporizer wherein the gas condenses thereby releasing latent heat to the working fluid in the vaporizer causing the working fluid to vaporize at a substantially constant temperature and pressure; and
   c) passing said hot liquid through a preheater interposed between the condenser and the vaporizer for preheating said condensate before it is returned to the vaporizer.

8. A method according to claim 7 wherein the two-phase fluid is geothermal fluid obtained from a production well, the geothermal fluid having a liquid phase in the form of hot geothermal water, and a vapor phase in the form of geothermal steam.

9. A method according to claim 8 wherein the steam condensate produced when the geothermal steam passes through the vaporizer, and the geothermal water that passes through the preheater, are disposed of by injection into a rejection well.

10. Apparatus for use with a hot two-phase fluid, comprising:
   a) a separator for separating the fluid into its two phases, one of which is a hot gas containing energy, in the form of latent heat, and the other which is a hot liquid containing energy in the form of sensible heat;
   b) a working fluid;
   first means receiving said working fluid in liquid state for transferring sensible heat into the liquid working fluid thereby producing preheated liquid working fluid; and d) second means receiving said preheated liquid working fluid for transferring latent heat in the hot gas to the preheated liquid working fluid, said second means being constructed and arranged so that said working fluid is vaporized at substantially constant temperature and pressure.

11. Apparatus according to claim 10, wherein said second means produces heat-depleted gas, and wherein means are provided for applying said heat-depleted gas to said second means.

12. Apparatus according to claim 10, wherein said first means produces heat-depleted liquid and said second means produces heat-depleted gas, and wherein the heat-depleted fluids are disposed of.

13. Apparatus according to claim 10 including a heat engine responsive to vaporized working fluid for converting some of the heat therein into work and producing heat-depleted working fluid.

14. Apparatus according to claim 13 including a condenser for condensing the heat depleted working fluid to a liquid that is supplied to said first means.

15. Apparatus according to claim 14 wherein said two phase fluid is a water dominated geothermal fluid.

16. Apparatus according to claim 13 wherein said second means is a vaporizer responsive to said hot gas for transferring latent heat in the gas to the working fluid thereby vaporizing the same.

17. Apparatus according to claim 16 wherein said heat engine is a turbine responsive to vaporized working fluid produced by said vaporizer for producing work and heat-depleted working fluid; said apparatus also including a condenser responsive to said heat-depleted working fluid for condensing the latter and producing working fluid condensate; and said first means is a preheater for receiving said condensate, and responsive to said hot liquid for transferring heat therefrom to the condensate and producing preheated working fluid.

18. Apparatus according to claim 17 wherein said two-phase fluid is a water dominated geothermal-fluid that has a liquid phase in the form of hot water and a vapor phase in the form of steam.

19. Apparatus according to claim 17 wherein said condenser is air cooled.

20. Apparatus according to claim 17 wherein said condenser is water cooled.

21. Apparatus according to claim 17 wherein said vaporizer includes means for venting noncondensable gases from the vaporizer.

22. Apparatus according to claim 21 in combination with a production well that produces a geothermal fluid, a rejection well for receiving rejected geothermal fluid, means for injecting into the rejection well said noncondensable gases vented from the vaporizer, and fluid exhausted from the vaporizer.

23. Apparatus according to claim 17 including means for applying condensate, produced from said hot gas as the hot gas passes through the vaporizer, to the preheater.

* * * * *